(12) United States Patent
Wu et al.

(10) Patent No.: US 9,210,604 B2
(45) Date of Patent: Dec. 8, 2015

(54) LOCATION BASED CARRIER AND TECHNOLOGY SPECIFIC SPECTRUM ANALYSIS

(71) Applicant: Fluke Corporation, Everett, WA (US)

(72) Inventors: Miles Wu, Fremont, CA (US); Richard S. Au, Los Altos, CA (US); Rajeswari Sethuraman, San Jose, CA (US); Rajesh Andusumilli, Santa Clara, CA (US); Yuyan Wang, San Jose, CA (US)

(73) Assignee: Fluke Corporation, Everett, WA (US)

( * ) Notice: Subject to any disclaimer, the term of this patent is extended or adjusted under 35 U.S.C. 154(b) by 281 days.

(21) Appl. No.: 13/886,838

(22) Filed: May 3, 2013

(65) Prior Publication Data
US 2014/0329469 A1  Nov. 6, 2014

(51) Int. Cl.
*H04L 12/26* (2006.01)
*H04W 24/00* (2009.01)
*H04W 4/02* (2009.01)
*H04W 24/10* (2009.01)
*H04L 29/08* (2006.01)

(52) U.S. Cl.
CPC ............. *H04W 24/10* (2013.01); *H04L 43/045* (2013.01); *H04W 4/02* (2013.01); *H04L 67/36* (2013.01); *H04W 4/021* (2013.01)

(58) Field of Classification Search
CPC ...... H04W 24/10; H04W 4/02; H04L 43/045; H04L 67/36
See application file for complete search history.

(56) References Cited

U.S. PATENT DOCUMENTS

| | | | |
|---|---|---|---|
| 2008/0096559 A1* | 4/2008 | Phillips et al. | 455/435.2 |
| 2012/0304087 A1* | 11/2012 | Walkin et al. | 715/764 |
| 2013/0281085 A1* | 10/2013 | Sen et al. | 455/426.1 |
| 2014/0099916 A1* | 4/2014 | Mallikarjunan et al. | 455/406 |

* cited by examiner

*Primary Examiner* — Bobbak Safaipour
*Assistant Examiner* — Devan Sandiford
(74) *Attorney, Agent, or Firm* — Locke Lord LLP; Scott D. Wofsy; Christopher J. Capelli

(57) ABSTRACT

There is provided a network test apparatus that determines a geographic location, determines one or more carriers operating within one or more frequency bands for the determined geographic location, and displays, in response to the determined geographic location, each carrier operating at one or more frequency bands at the determined geographic location.

17 Claims, 8 Drawing Sheets

LOCATION BASED CARRIER AND TECHNOLOGY SPECIFIC SPECTRUM ANALYSIS

BACKGROUND

1. Field of the Invention

The present disclosure relates to telecommunications network testing, and more particularly, to spectrum analysis for wireless networks.

2. Description of the Related Art

Telecommunication carriers (e.g., cellular carriers) typically operate within and license certain frequency bands that vary according to geographic location. Accordingly, network analysis (e.g., spectrum analysis) for a particular carrier requires knowledge of the frequency band(s) of the particular carrier at a given test location. In turn, determining the particular frequency band(s) for the particular carrier at the test location requires a user to expend a tremendous amount of time identifying the frequency band(s) for the carrier at the test location by looking up frequency setting information for each carrier within large and hard to search databases.

Such conventional methods to identify carriers operating at corresponding frequency bands for a particular geographic location have generally been considered satisfactory for their intended purpose. However, there is still a need in the art for improved techniques that readily identify carriers for the particular geographic location. The present invention provides a solution for these problems.

SUMMARY

According to one or more embodiments, a network test apparatus, system, method and/or software product for wireless network spectrum analysis is disclosed and is operable to determine one or more carriers operating within one or more frequency bands for a corresponding geographic location (e.g., a country, a region, a state, a county, a town, etc.). In particular, the disclosed apparatus, system, method and/or software product determines a geographic location, and display, in response to the determined geographic location, each carrier operating within one or more frequency bands at the determined geographic location.

In certain embodiments, the network test apparatus receives a user-selection of a particular carrier operating within a corresponding frequency band, performs spectrum analysis within the corresponding frequency band and displays, via the network test device, results of the spectrum analysis. With respect to performing spectrum analysis within the corresponding frequency band, the network test apparatus can perform the spectrum analysis according to technology specific data that includes at least one of Code Division Multiple Access (CDMA), Global System for Mobile Communications (GSM), Universal Mobile Telecommunications Systems (UMTS), Long Term Evolution (LTE), Enhanced Data Rates for GSM Evolution (EDGE), and the like.

In some embodiments, the network test apparatus periodically updates the one or more frequency bands for the one or more carriers for the geographic location. Additionally, the network test apparatus determines the geographic location of a user via, for example, a Global Positioning Signal (GPS), a manual user input, cellular triangulation, Internet Protocol (IP) address(es), and the like.

These and other features of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

Figure 1:
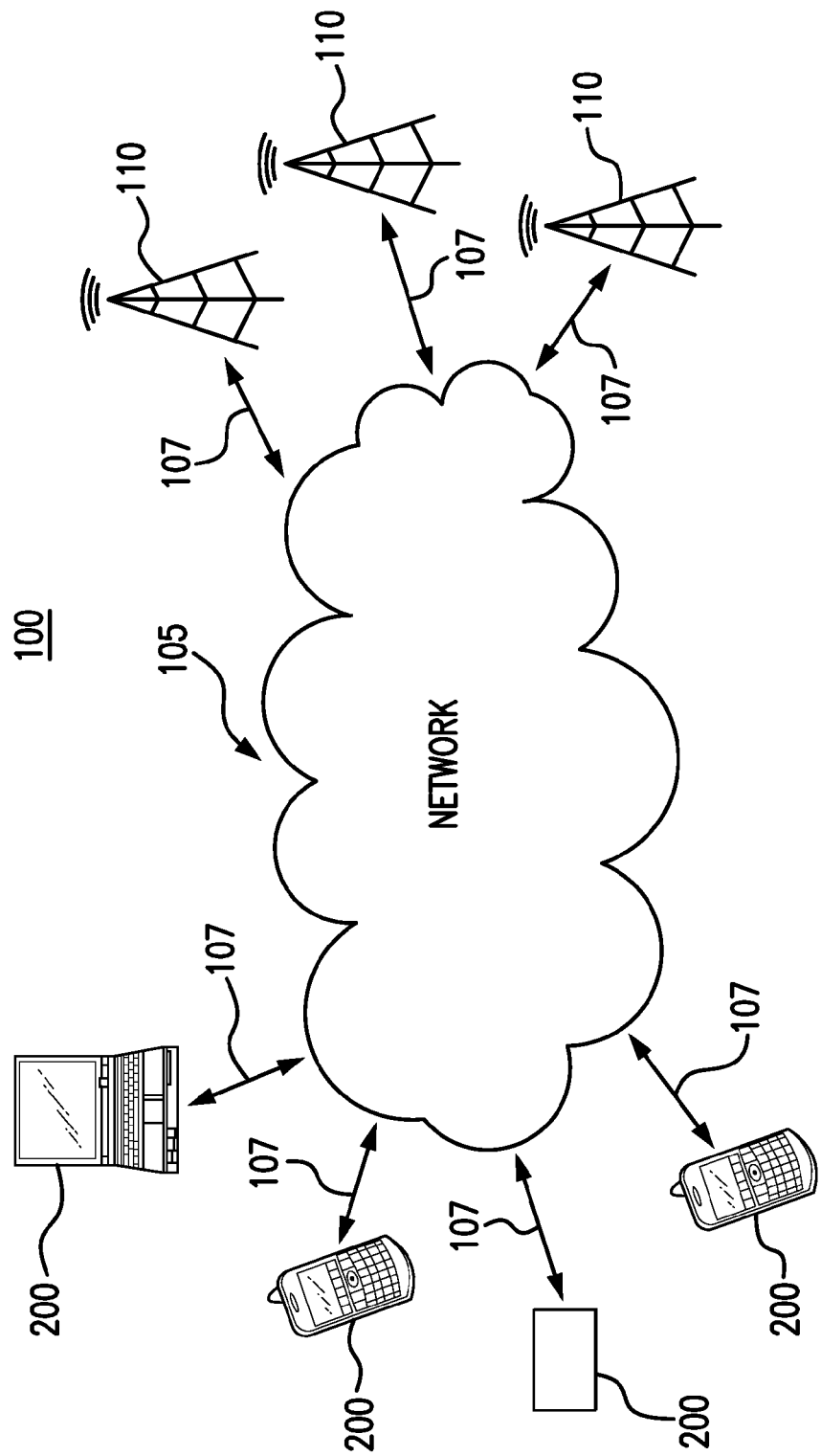
FIG. 1 is a schematic block diagram of an example communication network.

A telecommunication network is a geographically distributed collection of nodes (e.g., devices) interconnected by communication links and segments for transporting data between nodes. Referring initially to FIG. 1, a system is shown, generally designated 100, for facilitating communication in a telecommunication network 105. Network 105 supports voice and computer data communication amongst radio access network (RAN) devices/towers 110 and client devices 200 using various communication protocols for telecommunication carriers such as cellular PCS and Code Division Multiple Access (CDMA), Wideband Code Division Multiple Access (W-CDMA), Wireless Application Protocol (WAP), Global System for Mobile Communications (GSM), and the like.

As shown in FIG. 1, the links 107 may be wired links or may comprise a wireless communication medium, where certain client devices 200 may be in communication with certain RAN devices/towers 110, e.g., based on distance, signal strength, current operational status, location, etc. Client devices 200 can include any suitable device capable of communicating with telecommunication network 105. For example, client devices 200 can include, but are not limited to mobile phones, computers, laptops, tablets, and the like. Notably, the client devices 200 can be configured as network test devices and can perform various network testing techniques, as described herein. Additionally, those skilled in the art will also understand that any number of devices, links, etc. may be used in the telecommunication network, and that the view shown herein is for simplicity.

Figure 2:
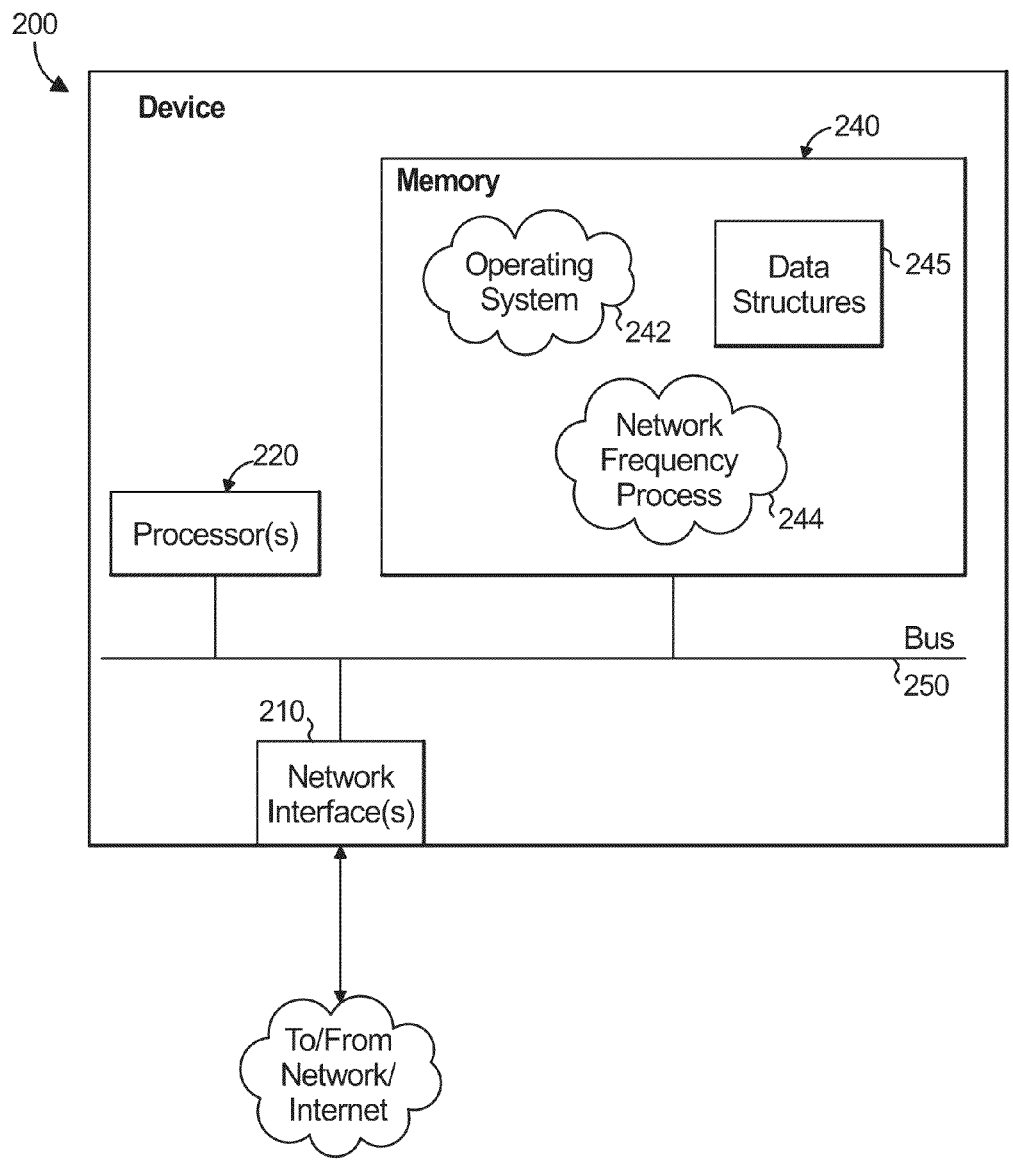
FIG. 2 is a schematic block diagram of an example node/device.

FIG. 2 is a schematic block diagram of an example client device 200 that may be used with one or more embodiments described herein. The device 200 includes one or more network interfaces 210, at least one processor 220 (e.g., a microcontroller), and a memory 240 interconnected by a system bus 250, as well as a power supply 260 (e.g., battery, plug-in, etc.).

The network interface(s) 210 contain the mechanical, electrical, and signaling circuitry for communicating data over physical and/or wireless links coupled to the telecommunication network 105. The network interfaces may be configured to transmit and/or receive data using a variety of different communication protocols, including, inter alia, wireless protocols (e.g., PCS, CDMA, W-CDMA, WAP, GSM, IEEE Std. 802.15.4, WiFi, Bluetooth®, etc.).

A memory 240 comprises a plurality of storage locations that are addressable by the processor 220 and the network interfaces 210 for storing software programs and data structures associated with the embodiments described herein. Certain devices may have limited memory or no memory (e.g., no memory for storage other than for programs/processes operating on the device). The processor 220 may comprise necessary elements or logic adapted to execute the software programs and manipulate data structures 245, such as routes or prefixes (notably on capable devices only). An operating system 242, portions of which are typically resident in memory 240 and executed by the processor, functionally organizes the device 200 by, inter alia, invoking operations in support of software processes and/or services executing on the device. These software processes and/or services may comprise network frequency process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Network frequency process (services) 244 contains computer executable instructions executed by the processor 220 to perform functions such as network spectrum analysis, as will be understood by those skilled in the art.

As noted above, conventional techniques to identify frequency band(s) that for carriers for a particular geographic location is inefficient and time-consuming. As discussed, identifying these frequency bands typically requires a user to look up frequency setting information in large and hard to search databases. Network frequency process 244 includes techniques that improve the previously inefficient and time-consuming process of looking up information in large and hard to search databases.

Illustratively, the techniques described herein may be performed by hardware, software, and/or firmware, such as in accordance with the network frequency process 244, which may contain computer executable instructions executed by the processor 220 (or independent processor of interfaces 210) to perform functions relating to the techniques described herein, e.g., spectrum analysis, determining one or more carriers operating within corresponding frequency bands based on a geographic location, etc.

In particular, network frequency process 244 is configured, on capable devices (e.g., one of client devices 200) to determine one or more carriers operating within one or more frequency bands for a corresponding geographic location (e.g., a region, a state, a county, a town, etc.), determine a geographic location, and display, in response to the determined geographic location, each carrier operating within one or more frequency bands at the determined geographic location.

In some embodiments, network frequency process 244 causes the network test device to receive a user-selection of a particular carrier operating within a corresponding frequency band, perform spectrum analysis within the corresponding frequency band and display results of the spectrum analysis. With respect to performing spectrum analysis within the corresponding frequency band, the network test apparatus may perform the spectrum analysis according to technology specific data that includes at least one of Code Division Multiple Access (CDMA), Global System for Mobile Communications (GSM), Universal Mobile Telecommunications Systems (UMTS), Long Term Evolution (LTE), Enhanced Data Rates for GSM Evolution (EDGE), and the like.

Figure 3A:
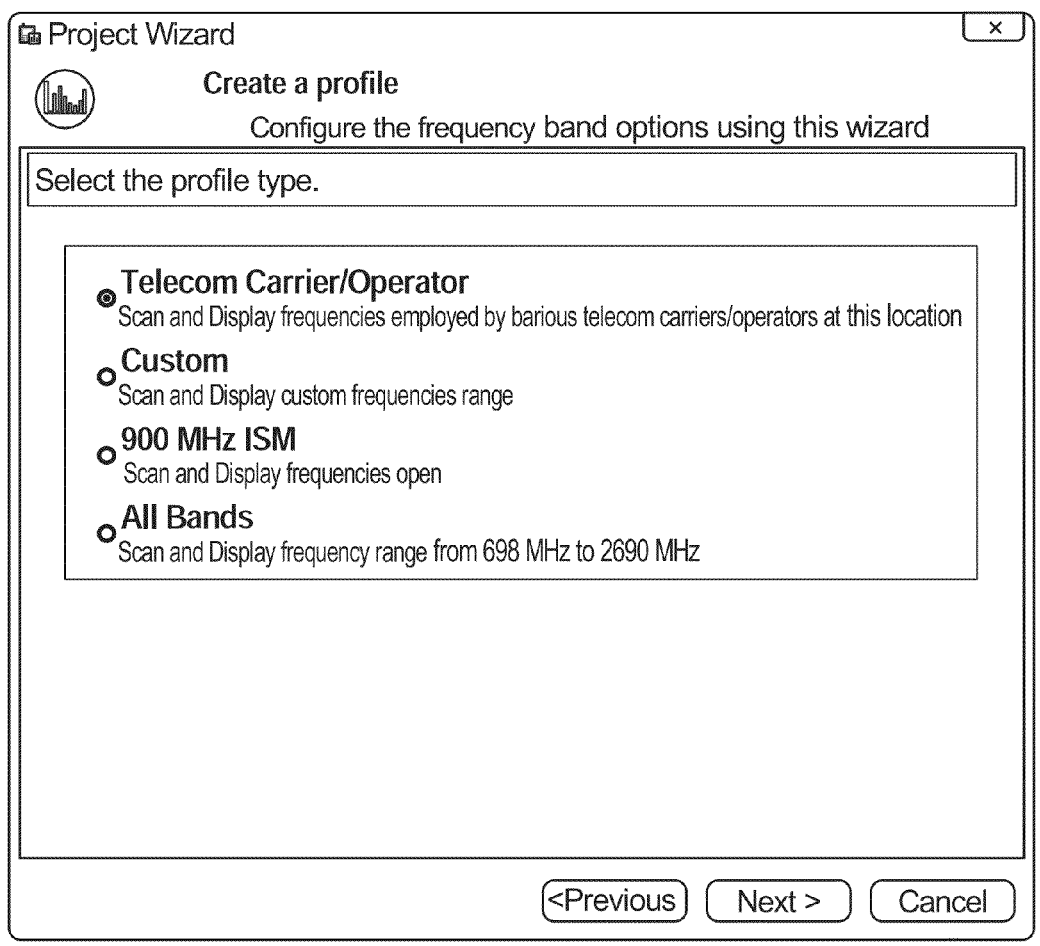
FIG. 3A is a screen shot of an initial profile creation screen, showing options for selecting a type of network scan.

In accordance with an illustrated embodiment, FIGS. 3A-3D, collectively, are screen shots of various profiles to determine a frequency band of a carrier based on a geographic location. A capable device such as one of client devices 200 can include a display configured to provide the profiles and display the various screen shots shown in FIGS. 3A-3D. With particular reference to FIG. 3A, an initial profile creation screen 300 shows options for selecting a type of network scan. Such options include scanning and displaying network analysis for particular frequencies. As shown, options include, for instance, scan and display of frequencies according to carriers ("Telecom Carrier/Operator"), custom frequencies ("Custom"), a 900 MHz ISM frequency ("900 MHz ISM"), and All Bands ("All Bands").

Figure 3B:
FIG. 3B is a screen shot of another profile screen, showing a geographic map for a user to select a location for the network scan to be conducted within.

When the option for Telecom Carrier/Operator is selected, the client device 200 displays a screen shot 301, shown in FIG. 3B. Screen shot 301 particularly shows a visual representation of a geographic area. A user selects a particular geographic location (within the provided geographic area) for a network scan to be conducted within. As discussed above, such geographic map can provide a location based on a country, a region, a state, a county, a town, etc. As shown, screen shot 301 displays specific states within the US. The user can select a particular state, i.e., California, for the network analysis.

Figure 3C:
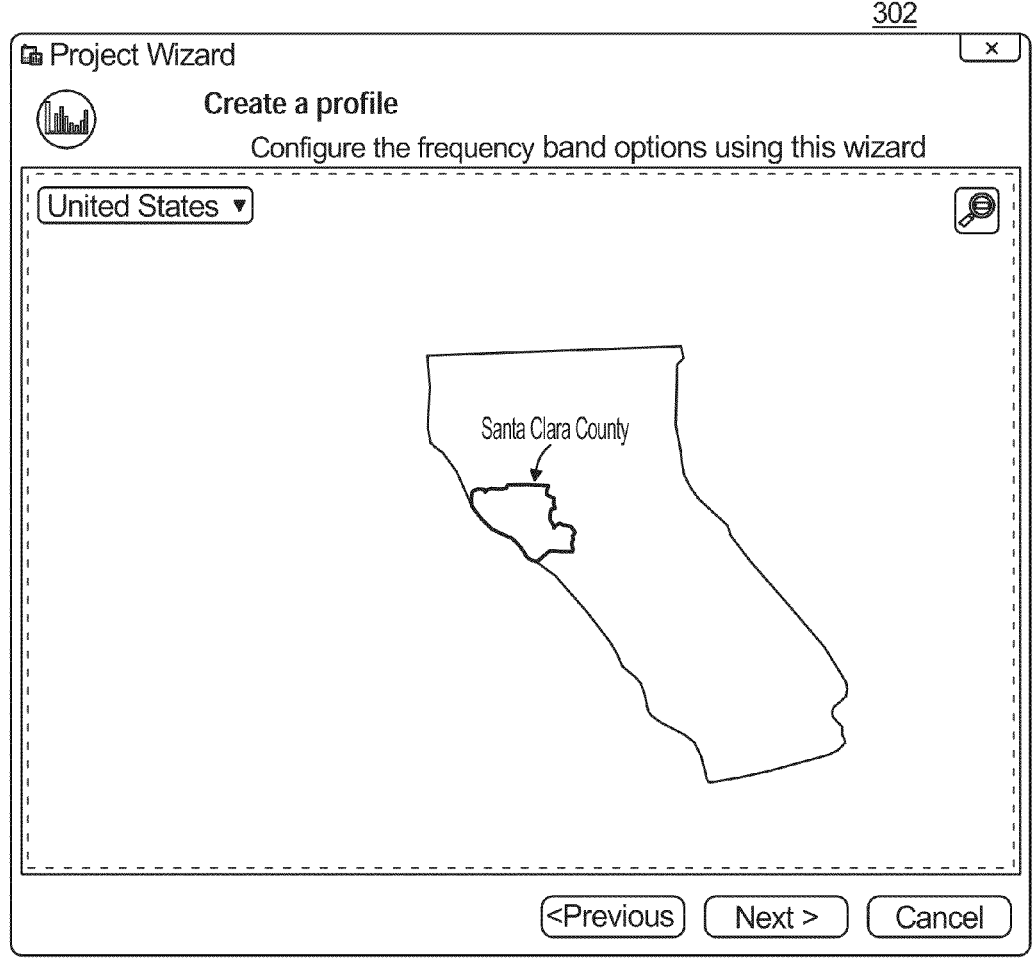
FIG. 3C is a screen shot of another profile screen, showing a map providing a smaller area or more detailed location shown in FIG. 3B.

For example, once the state is selected, the client device 200 displays a subsequent screen shot 302, shown in FIG. 3C. Screen shot 302 particularly provides a map showing a smaller area or more detailed location view than screen shot 301. That is, screen shot 302 provides a drill down from the larger state-view provided in FIG. 3B. As shown, screen shot 302 provides selectable views of various counties—here, Santa Clara County is selected. In various other embodiments, the location can be provided by, for example, a Global Positioning Signal (GPS) (e.g., of a client device 200), a manual user input of an address, cellular triangulation, an Internet Protocol (IP) address, and the like.

Figure 3D:
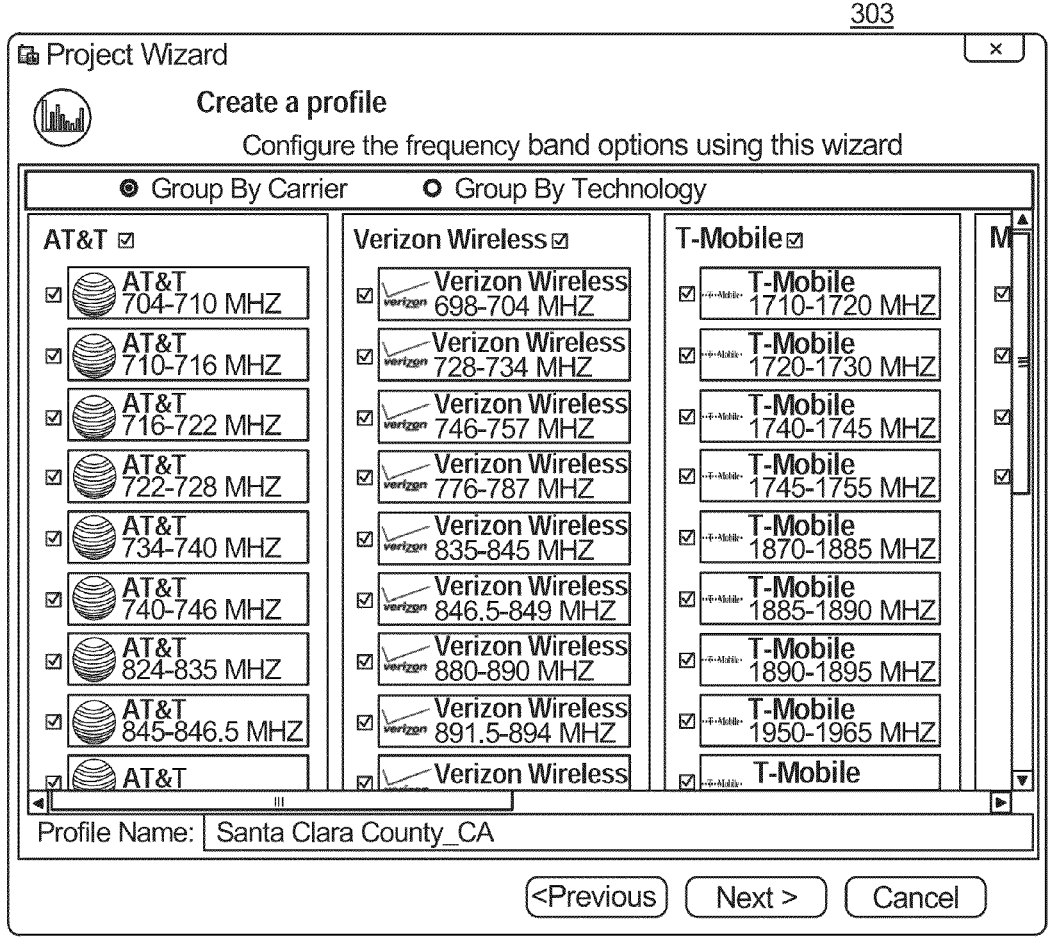
FIG. 3D is a screen shot of a profile screen, showing options for selecting frequency bands grouped by carrier or grouped by technology.

FIG. 3D provides a screen shot 303 showing options to select frequency bands grouped by carrier or grouped by technology (e.g., Code Division Multiple Access (CDMA), Global System for Mobile Communications (GSM), Universal Mobile Telecommunications Systems (UMTS), Long Term Evolution (LTE), Enhanced Data Rates for GSM Evolution (EDGE), etc.). Screen shot 303 presupposes a particular geographic location selected from screen shot 302. That is, while carrier specific option is selected, carriers operating within respective frequency bands for the particular geographic location selected in screen shot 302—namely, Santa Clara, Calif.—is provided.

Figure 4:
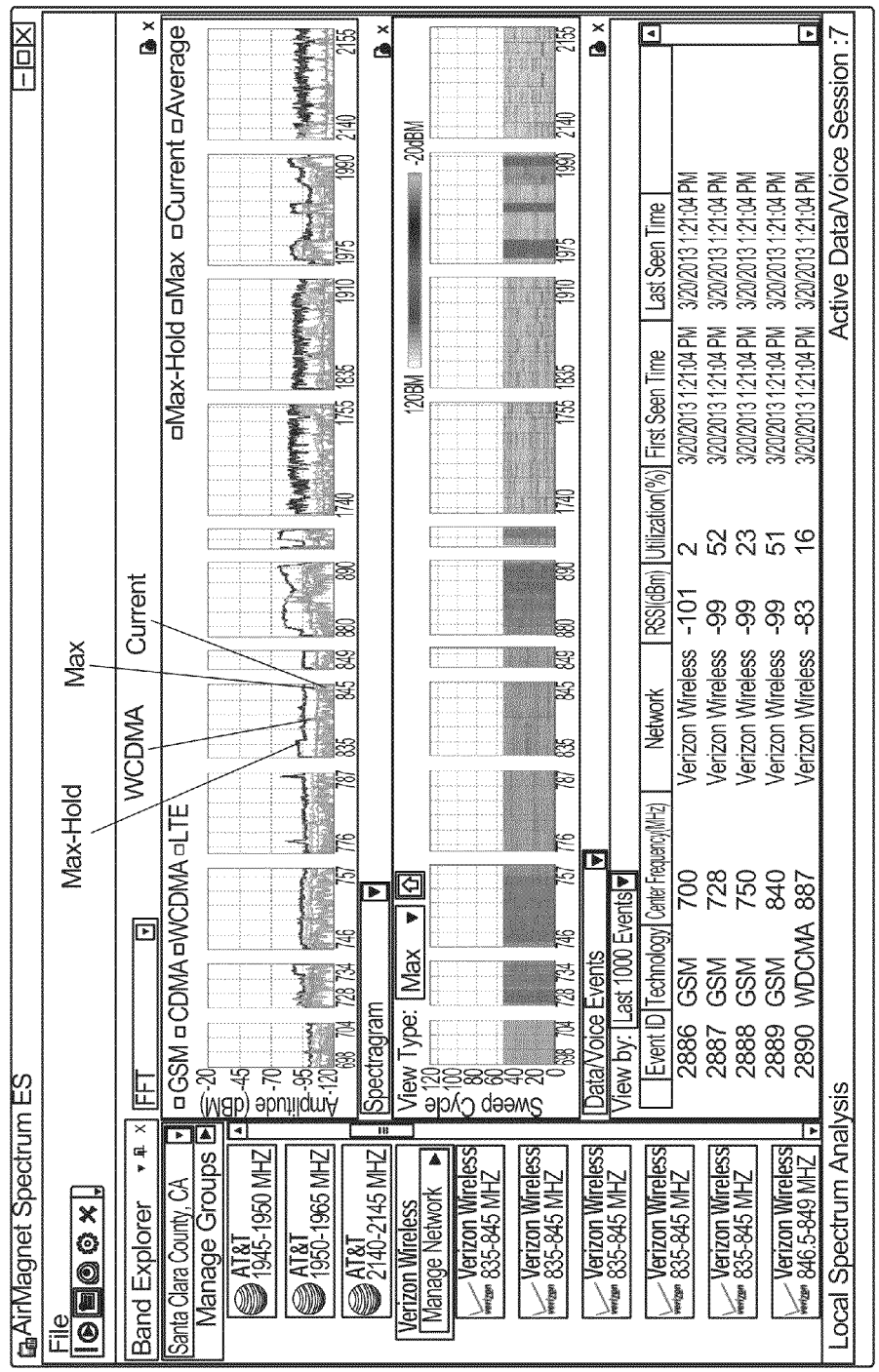
FIG. 4 provides a network analysis screen shot.

FIG. 4 provides a network analysis screen shot 400, showing resultant network analysis performed for a particular frequency bandwidth for a respective carrier. As to be incorporated by reference herein, the client device 200 can include an AirMagnet Spectrum ES, which is a computer implemented network testing tool for wireless (e.g., cellular) networks. In particular, the client device 200 can provide spectrum analysis of cellular radio frequencies (RF). Such spectrum analysis, as shown in FIG. 4, can include but is not limited to: band explorer, FFT spectrum analysis, carrier overlay, spectrogram, spectrum density, frequency duty cycle, data/voice events, interference events, and the like.

In further detail, band explorer is, for example, a tree view of the resulting regional profile setup which displays all the technology band information for a specific carrier in the region of interest or the regional carriers operating in the specific technology band. FFT or Fast Fourier Transform spectrum analysis is a real-time FFT graph displaying (in real time) the value of radio frequency (RF) power as a function of radio frequency. With respect to the FFT spectrum analysis shown in FIG. 4, the X-axis shows the frequency range of each channel in the selected radio band and the Y-axis shows power readings in dBm. Notably, the start and stop frequencies can be specific to a carrier owned band or can be specific to a technology band. Carrier overlay refers to regional carrier operator's information overlaid on top of the FFT and/or other charts named herein. Spectrogram provides a visualization of changes in a spectrum over a period of time and facilitates identification of shifts in frequency use and duration of such shifts. In the spectrogram shown in FIG. 4, the X-axis shows the frequency range covered by the selected radio and the Y-axis shows (in real time) the number of sweeps the spectrum adapter scans the RF spectrum. A horizontal line is plotted on the spectrogram each time the adapter scans the RF spectrum and makes one sweep cycle. New data appear at the bottom of the graph while old data are constantly pushed to the top. The sweep cycle values are mapped to a range of colors which corresponds to color range shown in the associated color legend. Spectrum density is shown as a graph indicating a frequency/power reading over time. As shown in FIG. 4, the X-axis shows the frequency or channel and the Y-axis shows the minimum and maximum power readings in dBm. A gradient is used to show a percent of occurrence (density) over time. Frequency duty cycle refers to a percentage of time that RF energy is present above a noise floor. Notably, the duty cycle calculation is done by summing up the duration of all pulses that are detected for the frequency. Data/voice events refer to detection log records of all the technology events or sessions that occur in a regional carrier band being scanned. Interference events provide an interference log record of all the technology events or sessions that occur in the regional carrier band being scanned.

Figure 5:
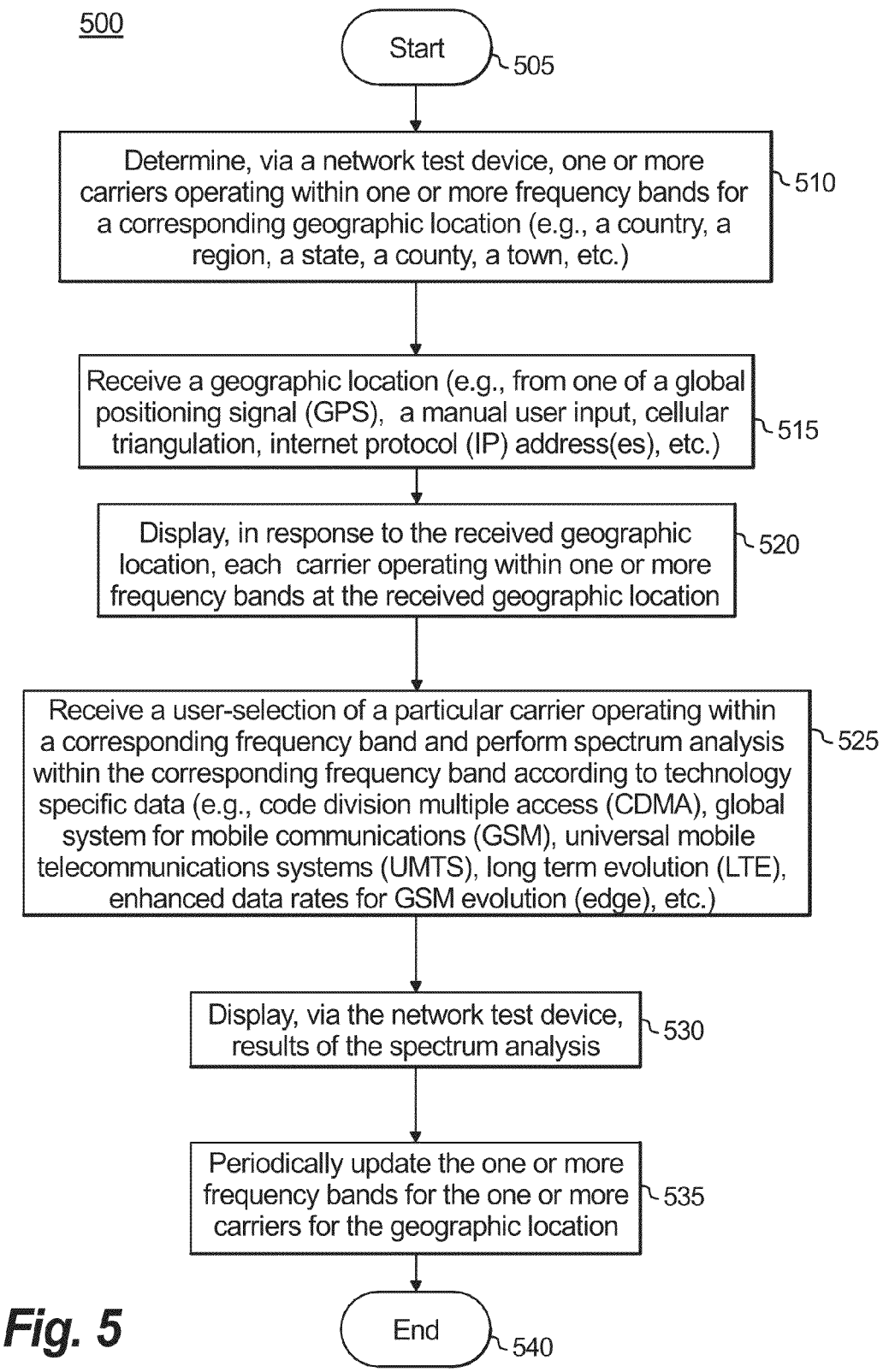
FIG. 5 illustrates an example simplified procedure for determining bandwidth frequencies for a carrier based on a geographic location, in accordance with one or more embodiments described herein.

FIG. 5 illustrates an example simplified procedure 500 for a network frequency selection based on a geographic location, particularly from the perspective of a client device 200, in accordance with one or more embodiments described herein.

Procedure 500 begins at step 505 and continues to step 510, where as discussed above, the client device (e.g., a network test device) determines a geographic location via, for example, a global positioning signal (GPS) of a client device, a manual user input or selection, cellular triangulation techniques, based on an Internet Protocol (IP) address, etc. Next, in step 515, client device determines one or more carriers operating within one or more frequency bands for the determined geographic location, which geographic location can be organized according to a country, a region, a state, a county, a town, etc. Procedure 500 continues to step 520 where, as discussed above, the client device displays each carrier operating within one or more frequency bands at the determined geographic location in response to the determined geographic location. In step 525, the client device receives selection of a particular carrier (e.g., from a user) and performs spectrum analysis for the selected carrier within the corresponding frequency band according to technology specific data. Such data can include, for example, Code Division Multiple Access (CDMA), Global System for Mobile Communications (GSM), Universal Mobile Telecommunications Systems (UMTS), Long Term Evolution (LTE), Enhanced Data Rates for GSM Evolution (EDGE), and the like. As discussed above in FIG. 4, the client device (in step 530) can further display results of the spectrum analysis. Additionally, in some embodiments, the client device can periodically update the one or more frequency bands for the one or more carriers for the geographic location, as shown in step 535. Procedure 500 can subsequently end in step 540, or it can continue to step 505 discussed above.

It should be noted that certain steps within procedure 500 may be optional and the steps shown in FIG. 5 are merely examples for illustration. Certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for determining frequency bands for a carrier based on a geographic location, it is to be understood that various other adaptations and modifications may be made within the spirit and scope of the embodiments herein. For example, the embodiments have been shown and described herein with relation to particular cellular technologies; however the embodiments in their broader sense are not as limited, and may, in fact, be used with other types of networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for wireless network spectrum analysis comprising:
   determining, via a network test device, a geographic location;
   determining one or more carriers operating within one or more frequency bands for the determined geographic location;
   displaying, in response to the determined geographic location, each carrier operating at one or more frequency bands at the determined geographic location;
   receiving a user-selection of a particular carrier operating within a corresponding frequency band;
   performing spectrum analysis within the corresponding frequency band for the selected particular carrier; and displaying, via the network test device, results of the spectrum analysis, the results comprising at least the information relating to the corresponding frequency band for the selected particular carrier.

2. The method of claim 1, wherein performing spectrum analysis within the corresponding frequency band comprises performing the spectrum analysis within the corresponding frequency band according to technology specific data that includes at least one of Code Division Multiple Access (CDMA), Global System for Mobile Communications (GSM), Universal Mobile Telecommunications Systems (UMTS), Long Term Evolution (LTE), and Enhanced Data Rate for GSM Evolution (EDGE).

3. The method of claim 1, wherein determining, via a network test device, a geographic location comprises:
providing a visual representation of a geographic area; and
receiving a selection of a geographic location within the visual representation of the geographic area.

4. The method of claim 1, further comprising:
periodically updating the one or more frequency bands for the one or more carriers for the geographic location.

5. The method of claim 1, wherein determining, via the network test device, the geographic location comprises receiving, via the network test device, the geographic location of a user.

6. The method of claim 5, wherein determining, via the network test device, the location from the user further comprises determining a location from the user via at least one of a Global Positioning Signal (GPS), a manual user input, cellular triangulation, and an Internet Protocol (IP) address.

7. The method of claim 1, wherein determining the one or more carriers operating within the one or more frequency bands for a geographic location comprises determining the one or more carriers operating within the one or more frequency bands for at least one of a country, a region, a state, a county, and a town.

8. A network test apparatus for wireless network spectral analysis, comprising:
one or more network interfaces adapted to communicate in a wireless communication network;
a processor adapted to execute one or more processes; and
a memory configured to store a process executable by the processor, the process when executed operable to:
determine, via the network test apparatus, a geographic location;
determine one or more carriers operating within one or more frequency bands for the determined geographic location;
display, in response to the determined geographic location, each carrier operating within one or more frequency bands at the determined geographic location;
receive a user-selection of a particular carrier operating within a corresponding frequency band;
perform spectrum analysis within the corresponding frequency band for the selected particular carrier; and
display, via the network test apparatus, results of the spectrum analysis, the results comprising at least the information relating to the corresponding frequency band for the selected particular carrier.

9. The network test apparatus of claim 8, wherein the process to perform spectrum analysis within the corresponding frequency band, when executed, is further operable to perform the spectrum analysis within the corresponding frequency band according to technology specific data that includes at least one of Code Division Multiple Access (CDMA), Global System for Mobile Communications (GSM), Universal Mobile Telecommunications Systems (UMTS), Long Term Evolution (LTE), and Enhanced Data Rate for GSM Evolution (EDGE).

10. The network test apparatus of claim 8, wherein the process, when executed, is further operable to:
periodically update the one or more frequency bands for the one or more carriers for the geographic location.

11. The network test apparatus of claim 8, wherein the process to determine, via the network test apparatus, the geographic location, when executed, is further operable to receive, via the network test apparatus, the geographic location of a user.

12. The network test apparatus of claim 11, wherein the process to determine, via the network test apparatus, the location from the user, when executed, is further operable to determine the location via at least one of a Global Positioning Signal (GPS), a manual user input, cellular triangulation, and an Internet Protocol (IP) address.

13. The network test apparatus of claim 8, wherein the process to determine the one or more carriers operating within the one or more frequency bands for a geographic location, when executed, is further operable to determine the one or more carriers operating within the one or more frequency bands for at least one of a country, a region, a state, a county, and a town.

14. A tangible, non-transitory, computer-readable media having software encoded thereon, the software, when executed by a processor, operable to:
determine, via a network test apparatus, a geographic location;
determine one or more carriers operating within one or more frequency bands for a corresponding geographic location;
display, in response to the determined geographic location, each carrier operating within one or more frequency bands at the determined geographic location;
receive a user-selection of a particular carrier operating within a corresponding frequency band;
perform spectrum analysis within the corresponding frequency band for the selected particular carrier; and
display, via the network test apparatus, results of the spectrum analysis, the results comprising at least the information relating to the corresponding frequency band for the selected particular carrier.

15. The tangible, non-transitory, computer-readable media of claim 14, wherein the process to perform spectrum analysis within the corresponding frequency band, when executed by the processor, is further operable to perform the spectrum analysis within the corresponding frequency band according to technology specific data that includes at least one of Code Division Multiple Access (CDMA), Global System for Mobile Communications (GSM), Universal Mobile Telecommunications Systems (UMTS), Long Term Evolution (LTE), and Enhanced Data Rate for GSM Evolution (EDGE).

16. The tangible, non-transitory, computer-readable media of claim 14, wherein the software, when executed by the processor, is further operable to:
periodically update the one or more frequency bands for the one or more carriers for the geographic location.

17. The tangible, non-transitory, computer-readable media of claim 14, wherein the process to determine the one or more carriers operating within the one or more frequency bands for a geographic location, when executed by the processor, is further operable to determine the one or more carriers operating within the one or more frequency bands for at least one of a country, a region, a state, a county, and a town.

* * * * *